United States Patent
Ward et al.

(10) Patent No.: US 6,314,470 B1
(45) Date of Patent: Nov. 6, 2001

(54) SYSTEM AND METHOD FOR ASYNCHRONOUSLY ACCESSING A GRAPHICS SYSTEM FOR GRAPHICS APPLICATION EVALUATION AND CONTROL

(75) Inventors: Alan D. Ward; Rex A. Barzee; Kevin T. Lefebvre; Don W. Dyer, all of Fort Collins, CO (US); James G. Dugger, Stuttgart (DE)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 08/900,688

(22) Filed: Jul. 25, 1997

(51) Int. Cl.[7] ........................................ G06F 9/00
(52) U.S. Cl. ............................ 709/328; 702/108
(58) Field of Search ........................ 709/300, 302, 709/310, 323, 328; 345/155, 520, 522, 526, 501; 714/37, 47, 38; 702/183, 120, 108

(56) References Cited

U.S. PATENT DOCUMENTS

| | | | |
|---|---|---|---|
| 4,945,536 | * 7/1990 | Hancu | 371/22.3 |
| 5,056,094 | * 10/1991 | Whetsel | 371/25.1 |
| 5,084,874 | * 1/1992 | Whetsel, Jr. | 371/22.3 |
| 5,333,302 | * 7/1994 | Hensley et al. | 395/575 |
| 5,432,940 | * 7/1995 | Potts et al. | 395/700 |
| 5,515,383 | * 5/1996 | Katoozi | 371/22.4 |
| 5,878,384 | * 3/1999 | Johnson et al. | 702/187 |
| 5,889,518 | * 3/1999 | Poreh et al. | 345/340 |
| 5,893,053 | * 4/1999 | Trueblood | 702/187 |
| 5,896,141 | * 4/1999 | Blaho et al. | 345/512 |
| 5,946,486 | * 8/1999 | Pekowski | 395/704 |

* cited by examiner

Primary Examiner—Alvin Oberley
Assistant Examiner—Lewis A. Bullock, Jr.

(57) ABSTRACT

A system for providing a graphics tool access to a computer graphics system to evaluate and control a graphics application executing on the computer graphics system. The system includes application program interface (API) event generators for performing predetermined operations relating to a graphics library function call and for generating a hook event containing results of the predetermined operations; dispatch table manger for selecting an active dispatch table from a normal operations dispatch table having function pointer to the graphics library fnctions and a hooks dispatch table having pointer to the API event generators; and hook event manager for enabling and configuring selected ones of the API event generators in response to a graphics tool event request. The system further includes internal event generators, integrated along various locations of a graphics pipeline managed by the graphics library, for performing predetermined diagnostic operations in the graphics system. In this embodiment the hook event manager also enables and configures selected ones of the internal event generators.

48 Claims, 7 Drawing Sheets

FIG. 7

DEBUG GRAPHICS TOOL

COMPUTER GRAPHICS SYSTEM WITH HOOKS MODULE

1. STARTUP APPLICATION
2. RUN APPLICATION FOR A WHILE

1. STARTUP TOOL
2. ATTACH TO VISLAB

3. NEXT CLEAR SCREEN HAPPENS, HOOKS ENABLED IN OGL LIBRARY (PLUGGED INTO DISPATCH TABLE), PER-FRAME OPERATIONS HANDLED
4. APP RUNS FOR A WHILE REPORTING PER-FRAME OPERATIONS

3. BREAKPOINT SET ON GLBEGIN

5. MANY GLBEGIN FUNCTION CALLS OCCUR
6. NEXT HOOK EVENT HAPPENS, SET BREAKPOINT EVENT IS READ, GLBEGIN EVENT IS ENABLED, AND BREAK SET

7. NEXT GLBEGIN HAPPENS SEND BREAK-ENCOUNTER EVENT

4. READ BREAK-ENCOUNTER EVENT

8. LOOP UNTIL BREAK-CONTINUE SEND BREAK-ENCOUNTER EVENT

5. SEND BREAK-CONTINUE EVENT

9. NEXT GLBEGIN HAPPENS

6. READ BREAK-ENCOUNTER EVENT LOOK AT STATE, ETC...

7. SEND BREAK-CLEAR EVENT

10. LOOP UNTIL BREAK-CLEAR

SYSTEM AND METHOD FOR ASYNCHRONOUSLY ACCESSING A GRAPHICS SYSTEM FOR GRAPHICS APPLICATION EVALUATION AND CONTROL

BACKGROUND OF THE INVENTION

1. Field of The Invention

The present invention relates generally to computer graphics systems and, more particularly, to the evaluation and control of graphics applications in a computer graphics system.

2. Related Art

Computer graphics systems are commonly used for displaying two- and three-dimensional graphics representations of objects on a two-dimensional video display screen. Current computer graphics systems provide highly detailed representations and are used in a variety of applications.

In a typical computer graphics system an object or model to be represented on the display screen is broken down into graphics primitives. Primitives are basic components of a graphics display and may include, for example, points, lines, quadrilaterals, triangle strips and polygons. Typically, a hardware/software scheme is implemented to render, or draw, the graphics primitives that represent a view of one or more objects being represented on the display screen.

The basic components of a computer graphics system typically include a computer graphics library that contains software routines that control graphics hardware in response to function calls issued by a graphics application. The graphics hardware may include, for example, a geometry accelerator, a rasterizer and a frame buffer. The system may also include other hardware such as texture mapping hardware. The geometry accelerator receives primitive data from a graphics application located on the host computer that defines the primitives that make up the model view to be displayed. The geometry accelerator performs transformations on the primitive data and performs such functions as lighting, clipping and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware are combined and stored in the frame buffer for display on the video display screen.

The graphics library typically provides an application program interface (API) to enable graphics applications executing on the host computer to efficiently control the graphics system. Commonly, the OpenGL® standard is utilized to provide a graphics library API to the graphics system. (OpenGL is a registered trademark of Silicon Graphics, Inc.).

The OpenGL software interface provides specific commands that are used to specify objects and operations to produce interactive, three-dimensional graphics applications. OpenGL is a streamlined, hardware-independent interface designed to be implemented on many different hardware platforms. As such, in computer systems which support OpenGL, the operating systems and graphics application software programs can make calls to the computer graphics system according to the standardized API without knowledge of the underlying hardware configuration.

The OpenGL standard provides a complete library of low-level graphics manipulation commands for describing models of three-dimensional objects (the "GL" of OpenGL refers to "Graphics Library"). This standard was originally based on the proprietary standards of Silicon Graphics, Inc., but was later transformed into an open standard which is used in high-end graphics-intensive workstations, and, more recently, in high-end personal computers. The OpenGL standard is described in the OPENGL PROGRAMMING GUIDE, version 1.1 (1997), the OPENGL REFERENCE MANUAL, version 1.1 (1997) and the OPENGL SPECIFICATION, version 1.1 (1997), all of which are hereby incorporated by reference in their entirety. The graphics library may be logically divided into software routines which are accessible through the API and routines or modules which control the graphics pipeline and device specific modules which contain software dedicated to the control of specific implementations of the graphics hardware components.

It is often necessary to evaluate and control the operations of the graphics application which is currently communicating with the graphics system. For example, the integrity of thie graphics application may need to be verified, the timing and efficiency of the graphics application may need to be evaluated, the proper and efficient use of graphics system resources may need to be determined or the extent to which specific aspects of the API are utilized may need to be established. These and other test, evaluation and monitoring operations may need to be performed during the initial design and integration of the graphics application as well as during subsequent modifications to either the graphics application or the graphics system. Conventional systems and techniques for performing such evaluation and control fimctions have been time consuming, inefficient, limited in their diagnostic capabilities and often difficult to use.

Conventional approaches typically include the use of a test and measurement library for providing some type of diagnostic tool access to the computer graphics system. This library is often referred to as an intercept library due to its logical placement between the graphics application that is being evaluated and the released graphics library, such as an OpenGL-conforming graphics library, with which it communicates.

The intercept library has the same set of entry points as the released graphics library. Thus, when implemented, the intercept library replaces the released graphics library and intercepts the graphics API calls generated by the graphics application. When the routines in the intercept library are called they either perform pre-programmed operations and/ or interact with a specific diagnostic tool. When their specific processing is completed, the intercept library functions call the released graphics library API entry point to invoke the desired operations within the computer graphics system.

There are number of drawbacks to this approach. A primary drawback is that the intercept library generally does not provide access, or attach, to a currently executing graphics application but instead requires the graphics application to be initiated in a manner that allows subsequent access. For example, in one common approach, the intercept library is implemented as an archived library. In this implementation, the graphics application which is normally linked to the graphics library, must be relinked with the intercept library to provide the intercept library access to the graphics application. In another common approach, the intercept library is implemented as a shared library. In this implementation, the graphics application must be re-initiated so as to load the intercept library rather than the released graphics library. In both implementations, this is often a time-consuming procedure which interferes with the software test and evaluation process, particularly since the test and evaluation process is an interactive one which is repeated often as system faults are identified.

In addition, this conventional approach cannot be implemented when the computer graphics system behaves unexpectedly. When an unanticipated graphics system response occurs during normal operations, the intercept library is unable to assist in the determination of the cause of the behavior since it is not linked to the graphics application during normal operations. The graphics application must be relinked or at least be stopped and reinitiated and the graphics application executed in such a manner so as to recreate the undesirable system response. However, since the nature of such system behavior is unpredictable, the problematic system responses are often difficult to replicate in the evaluation and control mode of operation, such as when performing testing, monitoring or other diagnostic procedures.

Another drawback to this approach is that when the intercept library is present it induces significant performance degradation to the graphics application regardless of whether it is currently performing any evaluation or control operations. In addition, additional efforts must be incurred to maintain version synchronization between the released graphics library and the intercept library.

A still further drawback to this approach is that the internal states and values of the graphics system are often not available to external processes, preventing the intercept library from gaining access to such information. To evaluate the performance of the graphics application the intercept library must perform significant processing to mimic the graphics systems processes, which incurs additional performance degradation, or forgo providing such information to the user.

What is needed, therefore, is a system that enables a user to perform desired evaluation and control operations on a currently executing graphics application in real-time without adversely affecting the performance of the computer graphics system.

SUMMARY OF THE INVENTION

In one aspect of the present invention, a computer graphics evaluation and control environment is disclosed. The system environment includes a computer graphics system, a graphics application configured to execute on and control the computer graphics system, a graphics tool for evaluating and controlling the computer graphics system, and a hooks module integrated within the computer graphics system for dynamically attaching the graphics tool to the computer graphics system during normal operations of the graphics application.

The computer graphics system generally includes graphics hardware and a graphics library for controlling the graphics hardware in accordance with function calls generated by the graphics application. The graphics library includes graphics library functions responsive to the function calls that are accessible through an applications program interface (API) defined by such function calls. The hooks module includes one or more API event generators installed within the graphics library, each configured to perform predetermined monitoring and control operations related to an associated function call in response to event requests and to provide the attached graphics tool with hook events containing results of the monitoring and control operations. The hooks module also includes means, responsive to the graphics tool, for installing the API event generators into the graphics library.

The computer graphics system also includes control modules for controlling the graphics hardware in response to the function calls received through the API. In one preferred embodiment, the hooks module also includes one or more internal event generators each configured to perform predetermined monitoring and control operations associated with a particular internal function of the control modules, and means for controlling the internal event generators in the graphics library.

In one preferred embodiment, the installing means includes means for dynamically redirecting one or more of the function calls generated by the graphics application to one of said API event generators, wherein the API event generators include means for calling the graphics library functions identified in the redirected function call. In one embodiment, the redirecting means includes a normal operations dispatch table including function pointers to the graphics library functions and a hooks dispatch table including function pointers to the API event generators. A means for copying either the normal operations dispatch table or the hooks dispatch table to an active dispatch table in the graphics library is also included, the active dispatch table being that which directs function calls in the graphics library.

In one embodiment, the one or more API event generators include means for enabling the attached graphics tool to monitor the selected operations related to the associated graphics library function. In another embodiment, the one or more API event generators include means for enabling the attached graphics tool to control the selected operations related to the associated graphics library function.

In one embodiment, the redirecting means includes a normal operations dispatch table including function pointers to the graphics library functions and a hooks dispatch table including function pointers to the API event generators. The redirecting means also includes means for copying either the normal operations dispatch table or the hooks dispatch table to an active dispatch table in the graphics library.

Typically, the graphics library includes pipeline control modules for managing a graphics pipeline in the graphics system and device-specific modules for controlling components of the graphics hardware. In such a system, the internal event generators include pipeline control module event generators for providing the attached graphics tool access to the pipeline control modules; and device-specific module event generators for providing the attached graphics tool access to the device-specific control modules. In one embodiment, the device-specific module event generators further provide the attached graphics tool access to components of the graphics hardware.

Preferably the graphics tools and the hooks module communicate with each other through a graphics tool interface. In one embodiment, the graphics tool interface is an interprocess communications (IPC) mechanisms providing socket communications between the graphics tools and the hooks module.

In another aspect of the present invention, a system for providing a graphics tool access to a computer graphics system to evaluate and control a graphics application executing on the computer graphics system. The system includes application program interface (API) event generators for performing predetermined operations relating to a graphics library function call and for generating a hook event containing results of the predetermined operations; dispatch table manger for selecting an active dispatch table from a normal operations dispatch table having function pointer to the graphics library functions and a hooks dispatch table having pointer to the API event generators; and hook event manager for enabling and configuring selected ones of the API event generators in response to a graphics tool event request.

In a preferred embodiment, the system further includes internal event generators, integrated along various locations of a graphics pipeline managed by the graphics library, for performing predetermined diagnostic operations in the graphics system. In this embodiment the hook event manager also enables and configures selected ones of the internal event generators.

In another aspect of the invention, a method for proving a graphics tool asynchronous access to a computer graphics system is disclosed. The method includes the steps of (a) installing an API event generator in a graphics library of the graphics system, the API event generator associated with a graphics library function; (b) receiving a function call issued from a graphics application to invoke a graphics application function; (c) routing the function call to the API event generator; (d) performing selected operations related to the associated graphics library function; (e) calling the associated graphics library function when the associated graphics library function is to be called; (f) forwarding results of the selected operations to the graphics tool; and (g) logging timing information with the graphics tool.

One advantage of the present invention is that it can be invoked at any time during the normal operations of the graphics application, attaching the graphics tool to the graphics system during the operation of the graphics application. This ability to attach to the graphics system in real-time (on-the-fly) enables the present invention to provide the graphics tool access to the graphics system immediately upon the occurrence of conditions which merit such evaluation and control, such as recognition of undesirable or unanticipated system behavior.

Another advantage of the present invention is that it dynamically determines when to attach the graphics tool to the graphics system and installs the API entry point event generators only at those times. This enables the present invention to provide the graphics tool a desired access to selected information only when needed and without causing the graphics system to incur performance penalties while the present invention is not operational. This also enables the present invention to provide the graphics tool access to the graphics system in a manner which is transparent to the graphics application.

Another advantage of the present invention is that by accessing the API function calls and internal functions and operations of the graphics system, the present invention provides the graphics tool with significant selected information related to the performance of the graphics application as well as control of the graphics application.

A still further advantage of the present invention is that it is integrated within the graphics library, thereby providing it with access to internal state and control flow of the graphics system which is otherwise unavailable to external processes. This enables the present invention to provide substantially more information to the tool than conventional approaches. This also provides the graphics tool with the ability to access different portions of the graphics pipeline, from the API through to the graphics hardware, thereby providing it with access to a wide range of information which is otherwise unavailable to external processes. This enables the present invention to provide substantially more information and control to the graphics tool than conventional approaches.

Another advantage of the present invention is that minimal performance penalties are incurred due to the integration of the present invention during normal operations of the graphics system since the API event generators are operationally removed from the graphics library when the hooks module is not enabled.

A further advantage of the present invention is that it communicates through a standard communication mechanism, providing the present invention with the ability to monitor and manipulate any desired performance-related information independent of the source of those requests. This enables the present invention to operate with a wide range of graphics tools which may be implemented for different purposes. For example, the graphics tool may be a graphics performance analysis tool, a graphics debugger or an environment state manipulator. Furthermore, the present invention may support one or more such graphics tools simultaneously, managing the flow of information requests and data between the graphics tools and the graphics system.

A further advantage of the present invention is that it allows control and switching of internal graphics library execution; that is, hardware, software or special purpose drivers, to allow on-the-fly comparison of operation, performance or detailed execution statistics, such as pixels drawn, primitives culled, etc.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 7 is a diagram illustrating the operations performed by a graphics system debug tool and the hooks module in an exemplary graphics application debug process.

DETAILED DESCRIPTION

Figure 1:
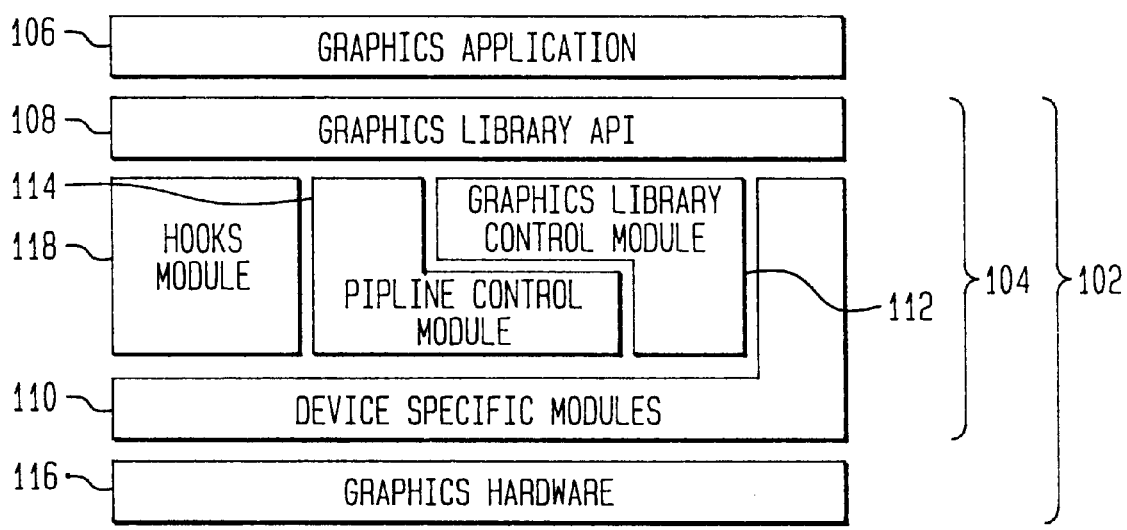
FIG. 1 is a architectural block diagram of an exemplary graphics system showing one possible implementation of the hooks module of the present invention.

FIG. 1 is an architectural block diagram of an exemplary computer graphics system 102 suitable for incorporation of the hooks module system of the present invention. As shown, the system 102 provides a well-known computer platform on which software applications such as graphics application 106 are executed. The system 102 communicates with and is responsive to the graphics application 106. The computer graphics system 102 includes a graphics library 104 through which the graphics application 106 controls graphics hardware 116 of the graphics system 102.

The graphics library 104 provides an application program interface (API) 108 of function calls through which the graphics application 106 communicates with the graphics library 104. The graphics library API 108 enables the graphics application 106 to efficiently control the graphics system 102. The graphics library API 108 is preferably a streamlined, hardware-independent interface designed to be implemented on many different computer platforms such as graphics system 102. As such, the graphics application 106 issues function calls to the computer graphics system 102 according to the standardized API 108 without knowledge of the configuration of the underlying graphics hardware 116. In the graphics system environment, the graphics library API 108 provides specific commands that are used to specify objects and operations to produce interactive, three-dimensional graphics applications.

In one preferred embodiment, the graphics library API 108 is an OpenGL® API, available from, for example, Silicon Graphics, Inc. The OpenGL API provides a graphics library of low-level graphics manipulation commands for describing models of three-dimensional objects. The OpenGL standard is described in the OPENGL PROGRAMMING GUIDE, version 1.1 (1997), the OPENGL REFERENCE MANUAL, version 1.1 (1997) and the OPENGL SPECIFICATION, version 1.1 (1997), all of which are hereby incorporated by reference in their entirety. However, as will be explained below, the graphics library API 108 may be any other proprietary or publicly available graphics library, such as the commonly available PEX (PHIGS extension to X) library available from, for example, the X-Consortium. The graphics application 106 may be any graphics software application now or later developed that is capable of communicating with the graphics system 102 through the implemented graphics library API 108.

The graphics library 104 includes a graphics library control module 112, pipeline control module 114 and one or more device specific modules 110. The graphics library control module 112 performs well-known functions such as managing the publicly visible graphics library state information and informing the rest of the graphics library 104 of state changes. The graphics library control module 112 also commonly defines and manages an API state structure, capturing state changes resulting from the graphics application 106 API function calls. The control module 112 also provides the graphics application 106 and the pipeline control module 114 and the device specific modules 110 with state information pertaining to the graphics library API 108. Importantly, the graphics library control module 112 includes the graphics library functions 224 defined by the API 108, and the corresponding data structures that store such states.

The pipeline control modules 114 perform well-known operations associated with controlling the graphics pipeline. For example, in the illustrative OpenGL embodiment, the pipeline control modules 114 controls the two- or three-dimensional graphics pipeline for the computer graphics system 102. The pipeline control modules 1 14 maintain derived internal graphics state information, including providing state information for the device specific modules 110 and the graphics hardware 116. In the embodiment wherein the graphics systems 102 implements an OpenGL API 108 and supporting architecture, the pipeline control modules 114 also select which rendering path, general or accelerated, is to be used. This includes scheduling operators, buffering vertex API data, and executing operators on primitives to generate data for rasterizers located in the graphics hardware 116.

The device-specific modules 110 provide primitive data, including vertex state (coordinate) and property state (color, lighting, etc.) data, to the graphics hardware 116. The graphics hardware 116 may be any well known graphics hardware such as the Visualize FX graphics system, available from Hewlett-Packard Company, Palo Alto, Calif. The graphics hardware 116 preferably provides a pipelined architecture which includes a geometry accelerator, a rasterizer, a frame buffer, and optionally, texture mapping or other hardware, all of which are considered to be well known in the art.

The hooks module 118, which is preferably integrated within the computer graphics system 102 and, more preferably, within the graphics library 104, dynamically attaches a graphics tool to the computer graphics system 102 during the operation of the graphics application 106. In one embodiment, the attachment occurs in response to an external request, such as requests generated by the graphics tool. This ability to provide a graphics tool on-the-fly (i.e., real-time) attachment to the graphics system 102 enables the hooks system 118 to provide the graphics tool immediate access to the graphics system to evaluate and control the graphics application 106 without having to re-link or re-initialize the graphics application 106. As a result, the hooks module 118 enables an operator to perform evaluation and control operations immediately upon encountering a condition in the graphics application 106 that merit such operations, such as the recognition of undesirable or unanticipated behavior in the computer graphics system 102. As will be explained in detail below, dynamic attachment of the hooks system 118 also includes the ability to immediately detach upon completion of the desired diagnostic operations. This insures that the presence of the hooks system 118 in the graphics library 104 provides graphics tools access to the desired diagnostic information only when needed and without causing the graphics system 102 to incur performance penalties while the hooks system 118 is not operational.

Figure 2:
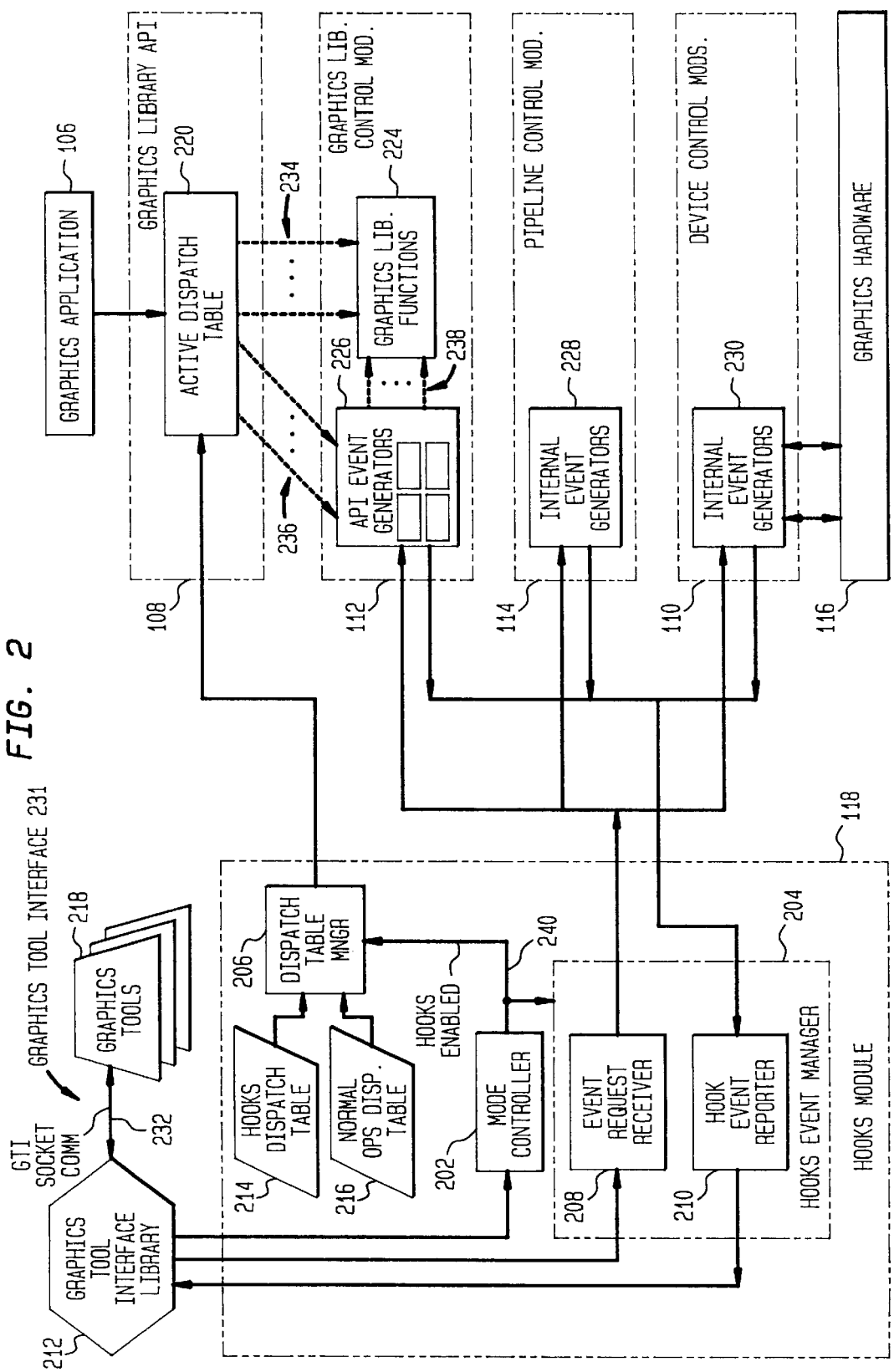
FIG. 2 is a functional block diagram of one embodiment of the hooks module of the present invention.

The function and operation of the hooks module 118 of the present invention is described below with reference to FIG. 2. FIG. 2 is a functional block diagram of one embodiment of the hooks module 118 implemented in the graphics system 102 illustrated in FIG. 1.

As noted, the hooks module 118 is implemented in the computer graphics system 102 to provide one or more graphics tools 218 asynchronous access to the graphics system 102 to evaluate and control the graphics application 106. The present invention provides the graphics tools 218 with the ability to dynamically monitor and control virtually any information in the computer graphics system 102 during real-time operations of the graphics application 106.

In a preferred embodiment described below, the graphics application 106 is evaluated and controlled by providing access to the publicly available graphics library application program interface 108 as well as the otherwise unavailable internal operations of the graphics library 104. In alternative embodiments, the graphics hardware 116 is also made accessible by the present invention. The occurrence of the conditions selected by the graphics tools 218 are generally referred to herein as hook events, and those portions of the present invention which monitor the graphics system 102 for such events are referred to as event generators.

The hooks module 118 may be dynamically enabled by the graphics tools 218 during the operation of the graphics application 106. When enabled, the hooks module 118 provides the graphics tools 218 access to the computer graphics system 102 asynchronous with the operations of the graphics application 106. When the hooks module 118 provides such access, it is said to have attached the graphics tools 218 to the computer graphics system 102. To provide the graphics tool 218 immediate attachment, the event generators 226–230 of the present invention are installed during the operation of graphics application 106. When the hook module 118 is enabled and the event generators are installed, the graphics library is said to be "instrumented" and the mode of the graphics system 102 transitions from a normal operational mode to what is referred to as an evaluation and control operational mode.

In a preferred embodiment, different approaches are used to obtain different graphics state information to minimize potential adverse effects on the performance of the graphics system 102. In one preferred embodiment, the event generators associated with the graphics library API 108, referred to herein as API event generators 226, are installed in the graphics library 104 only when the hooks module 118 is enabled and the graphics library 104 is to be instrumented. This is because the operations performed at the graphics library API 108 and graphics library control module 112 are time-critical; any unnecessary processing results in noticeable, and therefore unacceptable, performance degradation.

On the other hand, individual operations associated with the pipeline control modules 114 and device specific modules 110 are generally not as critical with respect to the performance of the graphics system 102. Accordingly, event generators associated with these portions of the graphics library 104, referred to as internal event generators 228 and 230, respectively, are preferably embedded within the graphics library 104 and are not installed and removed like the API event generators. When the graphics library 104 is instrumented, the internal event generators 228, 230 are enabled by the hooks module 118. Through the integration of the internal event generators within the graphics library 104, the present invention provides the graphics tool 218 with access to internal state and control flow of the graphics system 102 which is otherwise unavailable to external processes, enabling the present invention to provide substantially more information and control to the graphics tools 218 than conventional approaches.

Referring to FIG. 2, the graphics library API 108 typically includes a dispatch table 220 which includes function pointers 234 to graphics library functions 224 residing in the graphics library control module 112. This enables the graphics application 106 to call graphics library functions 224 using the standardized API 108 during normal operations.

To provide real-time or on-the-fly attachment of the graphics tool 218 to the graphics system 102, the hooks module 118 dynamically changes the dispatch table 220 residing in the graphics library API 108 with a hooks dispatch table 214 that includes function pointers 236 to API event generators 226 rather than the graphics library functions 224. The API event generators 226 each provide selected API hooks events and include function pointers 238 which point to the associated graphics library functions 234. Accordingly, the dispatch table 220 currently residing in the API 108 is referred to as the active dispatch table 220, and may contain a normal operations dispatch table 216 or a hooks dispatch table 214, or a combination of a normal operations dispatch table and a hooks dispatch table, depending upon the operational mode of the graphics system 102. This provides the hooks module 118 with a number of advantages over conventional approaches. For example, this enables the present invention to provide the graphics tools 218 with the ability to monitor and control desired data and operations of the computer graphics system 102 when needed without causing the graphics system 102 to incur performance penalties while the present invention is not operational. This also provides the advantage of providing the graphics tools 218 with such access in a manner which is transparent to the graphics application 106. It also allows extremely light weight tools which monitor only one or two API events leaving all other API functions in their normal operation.

The hooks module 118 generally includes a hooks mode controller 202, a dispatch table manager 206 and a hooks event manager 204. The mode controller 202 determines whether the hooks system 118 is to be enabled to provide the tools 218 asynchronous access to the computer graphics system 102. The dispatch table manager 206 has access to the hooks dispatch table 214 and the normal operations dispatch table 216, preferably stored in local memory, and performs the operations associated with installing the proper dispatch table into the graphics library API 108 as the active dispatch table 220.

The hooks event manager 204 includes an event request receiver 208 which receives, from the graphics tool 218, information pertaining to the desired operations which are to be performed by selected event generators 226–230. The event request receiver 208 enables the selected event generators 226–230 and controls the operation of the event generators in accordance with the event requests generated by the graphics tool 218. The hooks event manager 204 also includes a hooks event reporter 210 which receives the results of the event generators 226–230, and reports the event results to graphics tool 218.

It should be understood that the access provided by hooks module 118 of the present invention includes any type of access to any desired portion of the graphics system 102. Accordingly, the hooks module 118 supports any form of evaluation and control of the graphics application 106. Therefore, the graphics tools 218 may include any graphics tools now or later developed, such as a graphics performance analysis tool, a graphics debugger or an environment state manipulator, among others. In one embodiment multiple such graphics tools are simultaneously supported by the hooks module system 118 of the present invention.

The hooks module 118 and the graphics tool 218 communicate through a graphics tool interface (GTI) 231. In one preferred embodiment, the graphics tool interface 231 is any well-known interprocess communication (IPC) mechanism that establishes communications between the graphics tools 218 and the hooks module 118. Accordingly, in this embodiment, the hooks module 118 performs communications over a GTI socket 232 using a GTI library 212. An analogous library resides in the graphics tools 218.

The functions and operations of the hooks module 118 are described in greater detail below with reference to FIGS. 2 through 7. Initially, the function of the dispatch table manager 206 and API event generators 226 are described with reference to FIGS. 2 and 3. Then, the internal event generators 228 and 230, and the hooks event controller 204 are described in further detail. This will be followed by a detailed description of the mode controller 202 and its control of the dispatch table generator 206 and hooks event manager 204 based upon communications with graphics tools 218. Finally, a preferred graphics tool interface 231 is disclosed.

As noted, the dispatch table manager 206 determines the contents of the active dispatch table 220 based upon whether the graphics tools 218 request that the hooks module 218 be enabled and the graphics library 104 be instrumented. As will be explained in detail below, the mode controller 202 sets a hooks enabled condition flag 240 which is provided to, or accessed by, the dispatch table manager 206. The hooks enabled flag indicates when the hooks module 118 has been enabled or disabled by the graphics tools 218.

Figure 3:
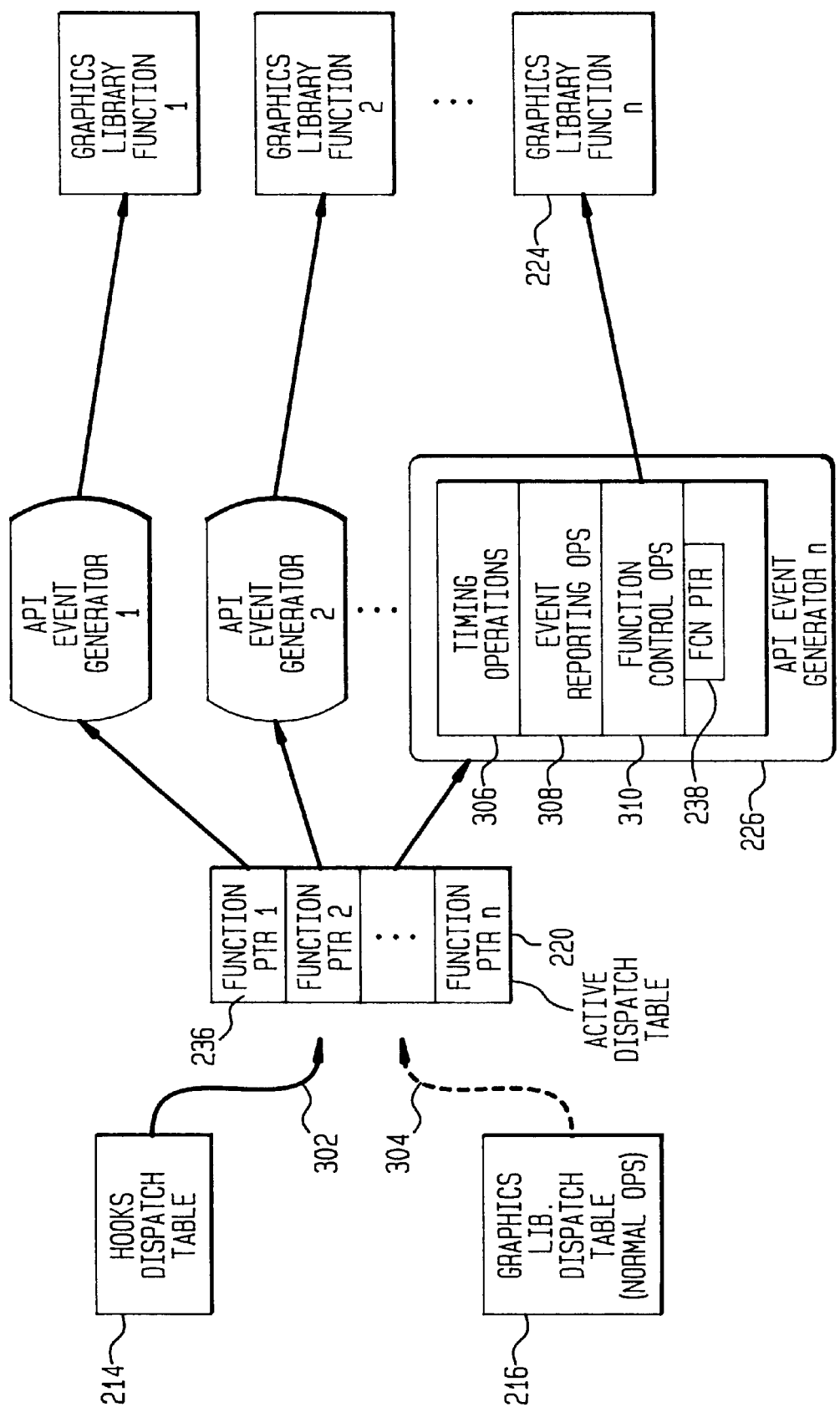
FIG. 3 is a control flow diagram illustrating one embodiment of the implementation of the API event generators of the present invention.

The dispatch table manager 206 accesses the available dispatch tables, including the hooks dispatch table 214 and the normal operations dispatch table 216. Preferably, these tables are residing in memory such as random access memory (RAM) that may be accessed by the dispatch table manager 206 quickly and efficiently. The dispatch table manager 206 copies either the hooks dispatch table 214 or the normal operations dispatch table 216 or portions of each to the location of the active dispatch table 220 in the graphics library API 108. The graphics API entry points are implemented by calling through the active dispatch table 226. The selection and copying of the dispatch tables 214 and 216 is illustrated in FIG. 2 by selected dispatch table line 241. In FIG. 3, the arrows 302 and 304 indicate the selection by the dispatch table manager 206, with arrow 302 being solid and arrow 304 being dashed to indicate that the hooks dispatch table 214 has been copied to the active dispatch table 220.

In the illustrative embodiment shown in FIG. 3, when the hooks dispatch table 214 is copied to the active dispatch table 220, the table 220 includes many function pointers 236, each pointing to an API event generator 226 in accordance with the present invention. Each API event generator 226 performs the function of an API entry point wrapper function. As such, each API event generator 226 calls an associated graphics library function 224 through a function pointer 238 to enable the graphics application 106 to control the graphics system 102. As a result, the graphics application 106 does not need to be modified to accommodate the operations of the hooks module 118. The graphics application 106 simply makes the same function calls which, when hooks module 118 is enabled, causes the API event generator 226 to perform operations in accordance with the present invention. The API event generators 226 then call the graphics application function 224 which was intended to be invoked by the graphics application 106. In other words, the graphics application 106 calls the graphics library functions 224 indirectly through the API event generators 226 when the hooks module 118 is enabled.

Each API event generator 226 may be configured to perform any number of desired functions upon the execution of the associated API function call. Referring to FIG. 3, three types of functions are illustrated. In the exemplary embodiment, the API event generators 226 perform timing operations 306, event reporting operations 308 and function control operations 310.

Timing operations 306 provide the graphics tools 218 with various timing information, such as the time to perform the associated graphics library function 224. Other timing information related to the processing of the associated API function call may also be performed, depending upon the requirements of the particular graphics tool 218. Event reporting functions 308 simply report the occurrence of the hooks events through the GTI 231 to the graphics tools 218.

The function control operations 310 include operations associated with the invocation of the associated graphics library function 224. For example, the graphics application function 224 may be invoked or not invoked, its invocation may be delayed by a predetermined period of time, etc. These and other operations related to the control of the invocation of the graphics library function 224 may be performed by the API event generator 226. As shown in FIG. 3 and noted above, the function control operations 310 make a function call to the associated graphics library function 224 using the function pointer 238.

In a preferred embodiment of the present invention, there is one API event generator 226 for each of the API entry points available in the graphics library API 108, and each API event generator 226 includes a single function pointer call 238 to an associated graphics application function 224. As one skilled in the art would find apparent, other arrangements may be implemented and are considered to be within the scope of the present invention. It should be understood, however, that the above arrangement is preferred due to the negligible impact on the performance of the computer graphics system 102. There is no overhead associated with the hooks module 118 when the hooks module is not enabled. This is because the hooks module 118 copies the normal operations dispatch table 216 to the active dispatch table 220 during normal operations in accordance with the present invention. And, during evaluation and control modes of operation, the installation of the hooks dispatch table 214 causes the graphics system 102 to incur minimal, but expected performance degradation. It should also be noted that the copying of the dispatch tables 214 and 216 to the active dispatch table 220 is performed rarely; only when the graphics tools 218 enable or disable the hooks module 118 is the active dispatch 220 changed. Therefore, the copying of the dispatch tables 214 and 216 cause the computer graphics system 102 to incur no noticeable performance degradation.

Figure 4:
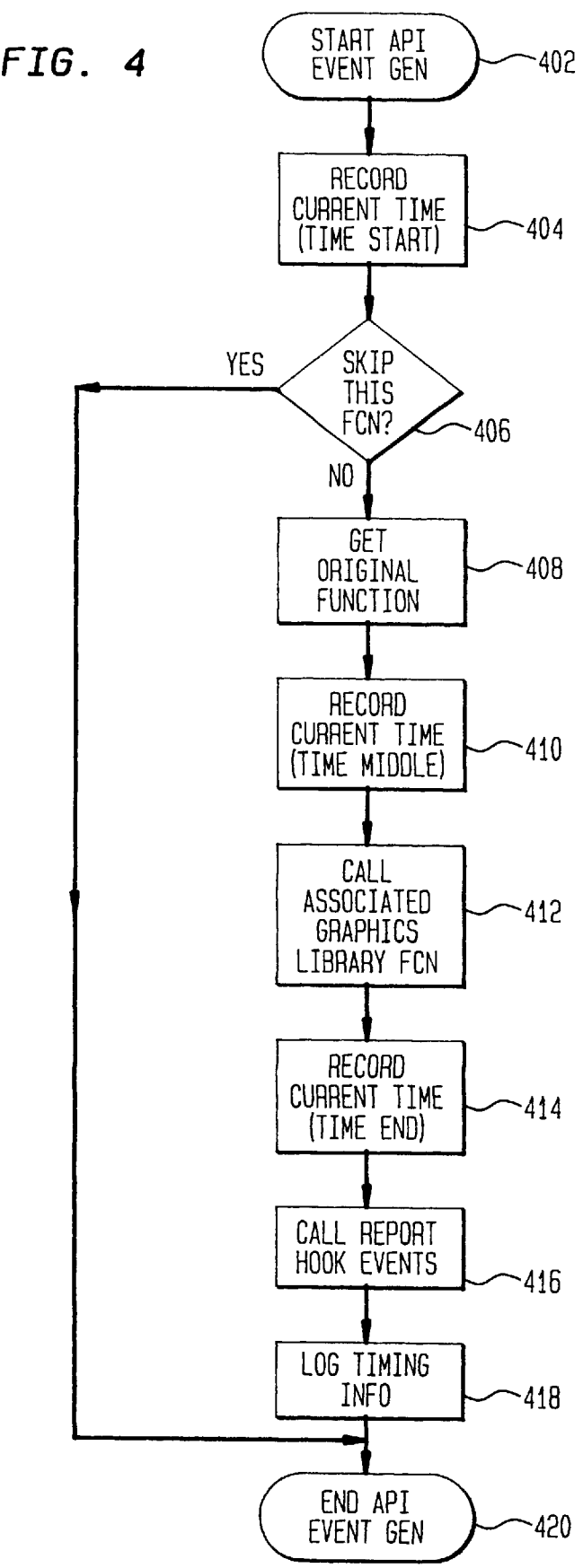
FIG. 4 is a flow chart of one embodiment of the process performed by the hooks module of the present invention to log API events.

A flow chart of an exemplary process performed by the API event generator 226 is illustrated at FIG. 4. At start block 402, the graphics application 106 issues a function call which is routed to the API event generator 226 due to the presence of the function pointer 236 in the active dispatch table 220.

At block 404, the API event generator 226 records the current time, referred to as time start. The API event generator 226 then determines whether it is going to call the associated graphics library function 224 at decision block 406. The API event generator 226 may not call the associated graphics library function 224 if, for example, the user does not need to have the graphics system 102 render the primitive associated with the API function call.

If the associated graphics library function 224 is to be invoked, then the API event generator 226 retrieves the original graphics library function 224 at block 408 and records the current time, referred to as time middle, at block 410. The API generator 226 then calls the associated graphics library function 224 at block 412 and again records the current time, referred to as time end, at block 414. At block 412, the associated graphics library function 224 is called by the API event generator 226.

At block 416, the API event generator 226 forwards the event results to the hook event reporter 210 in the hook event manager 204. Timing information based on the recorded time is also logged in the same manner at block 418. Processing then completes at end block 420.

The internal event generators 228–230 are described in further detail with reference to FIGS. 2 and 5. As noted, the internal event generators 228 and 230 are embedded within the graphics library 104. When the graphics library 104 is instrumented, the internal event generators 228 and 230 are enabled or disabled. Significantly, through the integration of the internal event generators within the graphics library 104, the present invention provides the graphics tool 218 with access to internal state and control flow of the graphics system 102 which is otherwise unavailable to external processes. The internal event generators 228 and 230 may be configured to generate an event containing any desired information, or providing any desired control over the associated function and operations of the graphics library 104 and graphics hardware 106.

In one preferred embodiment, the internal event generators 228 and 230 retrieve various predetermined conditions, such as values of variables, to generate a resulting hooks event. In one embodiment, such information includes the scheduling path through the graphics pipeline. As is common in many computer graphics systems such as system 102, the rendering of a primitive provided by the graphics application may be performed utilizing what is commonly referred to as the software path (the slow path) or the geometry accelerated path (the fast path). In this embodiment, should the general path be utilized, the internal event generators 228 and 230 also provide the reasons why the primitive is not progressing through the accelerated path, such as the fact that no geometry accelerators are currently present, that texture mapping is required but there is no texture map hardware, etc. Internal event generators 228, 230 may also provide such information as to whether indexed lighting is active, and the lighting space (eye or object). The creation and operation of internal event generators 228 and 230 to monitor or control specific information is considered to be well known in the art. Typically, such generators may set a flag representing a particular condition by evaluating the values of, one or more variables.

As noted, in one embodiment, the internal event generators 230 located in the device specific modules 110 are configured to access information in the graphics hardware 116 in some well-known manner. In this embodiment, the internal event generators 230 may read values set by various hardware components, such as the geometry accelerator (for example, the number of primitives processed) or texture mapping system (for example, the number of pixels processed). Communicating such information from the graphics hardware and the graphics library 104 is well-known in the art.

The hooks event manager 204 will be described in detail below with reference to FIGS. 2 and 5. The hooks event manager 204 includes the event request receiver 208 and the hook event reporter 210. Generally, the hooks event request receiver 208 communicates with the graphics tools 218 to determine which of the event generators 226–230 are to be enabled, and the operational parameters of the event generators. In one embodiment, the event request receiver 208 controls which event generators are enabled by maintaining a table or array of globally-available boolean flags, each corresponding to a hooks event generator 226–230. These boolean flags are then available to be read by the event generators prior to performing their respective operations. In one embodiment, the event request receiver 208 controls each event generator 226–230 by controlling classes of internal events. The ability to control classes of internal event generators enables the hooks module 118 to enable specific portions of the API and event generators with minimal processing.

The hooks event reporter 210 receives results of the event generators (API and internal) and forwards them to the graphics tool 218 through the graphics tool interface library 212 and communications channel 232. The hooks event reporter 210 also interoperates with the event request receiver 208 to determine whether the graphics tools 218 have issued an event request since the last time an event request was received.

The hooks event reporter 210 also sends the graphics tools 218 a stream of API events that are sufficient to recreate the current state of the graphics system 102 including, for example the textures, colors and display lists in the graphics library 104. This is necessary since the hooks module 118 of the present invention may be dynamically invoked during the normal operations of the graphics application 106. As such, the graphics tools 218 are unaware of the current state of the graphics application 106 when the tools 218 are initially attached to the application 106. In one embodiment, the hooks event manager 204 invokes all of the API event generators 226 requesting that they provide the current value for their associated graphics library function 224. Such information is commonly shared during normal operations in the data structures residing in the graphics control module 112 noted above. Other well-known methods for providing the graphics tools 218 with the current state of the graphics application 106 may be implemented in the hooks event manager 204.

In addition to providing graphics application state dumps as noted above, the hooks event manager 204 also enables the graphics tools 218 to control storage and replay of the state and operations of the graphics application 106. There are many known techniques which may be employed to perform such functions. For example, a graphics tool 218 may request the hooks module 118 to capture what is commonly known as a trace of API events during the operation of the graphics application 106. When invoked, the current and all subsequent API events are stored in a memory. When the trace is replayed, the graphics application 106 is return to the stored state and progress forward through the subsequently-saved API function calls under the control of the graphics tool 218.

Figure 5:
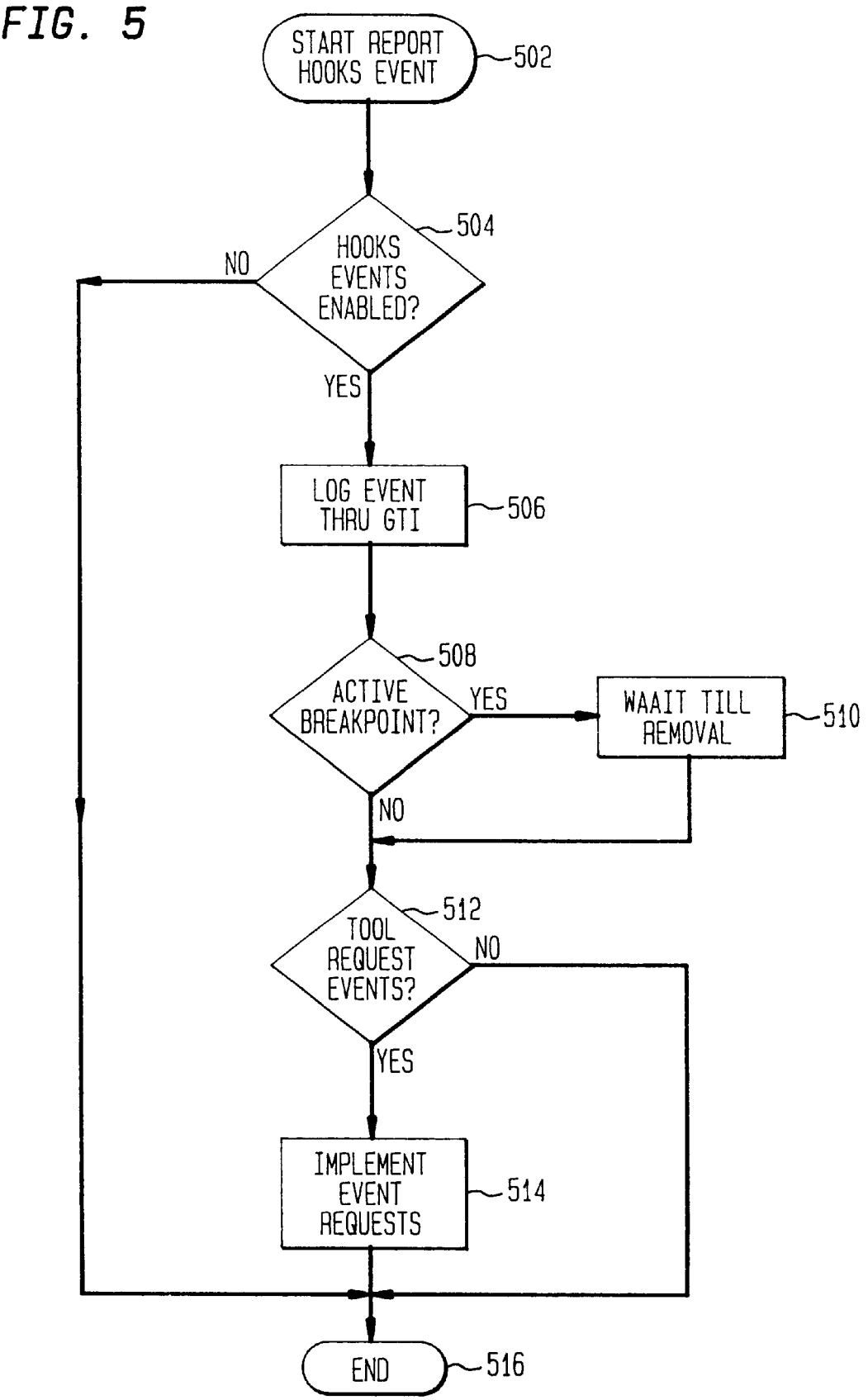
FIG. 5 is a flow chart of one embodiment of the process performed by the hooks module of the present invention to report hooks events.

A flow chart of an exemplary process performed by the hooks event manager 204 of the present invention to report a hooks event is shown in FIG. 5. At start block 502, the hooks event reporter 210 is enabled and processing begins to report event results to a graphics tool 218 through the graphics tool interface 212. At block 504, the hooks event manager 204 determines whether the hooks event has been enabled. If so, then the event result is logged through the graphics tool interface 212. Otherwise processing completes at end block 516.

At block 508, the hooks event manager 204 determines whether an active breakpoint has been enabled for this API event or internal event. If so, then the hooks event manager 204 waits at block 510 until the breakpoint has been removed. At block 512, the graphics tool 218 determines if the graphics tool 218 has requested any additional events while the hooks event manager 204 was idle waiting for the removal of the breakpoint at block 510. If no tool request events have been received, then processing completes at box 516. Otherwise, the requested event is implemented at block 514. Afterwards, processing completes at end block 516.

The mode controller 202 is described with reference to FIG. 2. The mode controller 202 controls the dispatch table generator 206 and hooks event manager 204 based upon communications with graphics tools 218 as noted above.

The mode controller 202 periodically monitors the graphics tool interface 231 to determine when one of the graphics tools 218 requests to be attached to the computer graphics system 102. The mode controller 202 also checks to determine if a graphics tool 218 is to attach to a graphics application each time a context is created. Typically, a context is created when a another instance of the same or another graphics application 106 is launched. In one embodiment, the mode controller 202 monitors the graphics tools 218 to determine whether to attach to the graphics application 106 when a screen refresh occurs. This enables the mode controller 202 to respond to an attach request quickly while limiting the processing burden such periodic requests place on the computer graphics system 102.

When a graphics tool 218 requests attachment, the mode controller 202 informs the dispatch table 206 to swap the normal operations dispatch table 216 with the hooks dispatch table 214 as the active dispatch table 220 as described above. The mode controller 202 also notifies the hooks event manager 204 of the same information, which is required by the hook event manager to determine whether to enable the event generators. In one preferred embodiment, the mode controller 202 monitors the GTI 231 when the screen is refreshed to detect changes in tool attachment.

The graphics tool interface library 212 provides the function calls needed to establish a communications connection between the graphics tool 218 and the hooks module 118. As noted, the graphics tool interface is any well-known interprocess communication (IPC) mechanism that establishes communications between the graphics tools 218 and the hooks module 118. Accordingly, in this embodiment, the hooks module 118 performs communications over the GTI socket 232 using a GTI library 212. An analogous library, therefore, resides in the graphics tool 218. It should be understood that other types of communication mechanisms may be used. For example, in an alternative embodiment, the GTI interface 231 may be, for example, shared memory. Because the GTI 231 is implemented as part of the hooks module 118 and therefore resides at the peer level of the graphics libraries 104, the GTI is non-invasive with respect to the is graphics application 202. The graphics tool interface preferably registers the graphics application 106 and the graphics tools 218 in shared memory to provide them with the ability to identify the presence of the other. In the embodiment wherein the graphics library 104 supports the OpenGL API, when an OpenGL context is created a function call is made to initialize the graphics tool interface 231. This causes the GTI 231 to register the graphics application 106 in shared memory, enabling the graphics tools 218 to identify when the graphics application 106 is executing on the graphics system 102.

Figure 6:
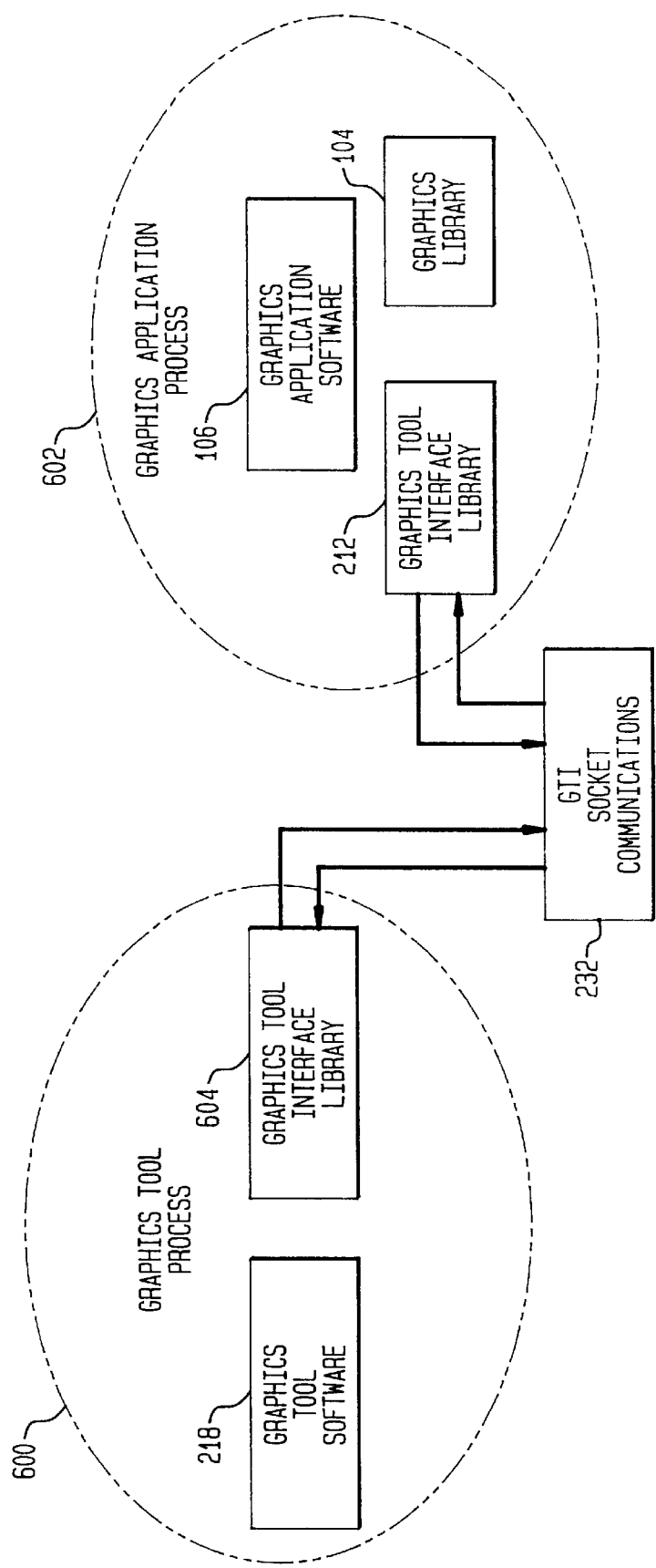
FIG. 6 is a process interface diagram of a software embodiment of the hooks module of the present invention.

FIG. 6 is process interface diagram of one preferred software embodiment of the hooks module 118 of the present invention. As shown, there are two processes operating in this illustrative test and evaluation environment: a graphics tool process 600 and a graphics application process 602. The graphics tool process 600 includes the graphics tool 218 embodied in a software program. The graphics application process 602 includes the graphics application 106 and graphics library 104, both of which are embodied in a software program as well. The processes 600 and 602 communicate over a GTI socket communications 232. Accordingly, each process 600 and 602 includes a respective graphics tool interface library 604 and 212, respectively.

The processes 600 and 602 are preferably configured as generic software applications that resides on any well-known computing platform. A typical computer platform that may support the processes is the computer graphics system 102 shown in FIG. 1. In addition to the graphics hardware noted above, the computer graphics system 102 includes a processor connected to a memory system through an interconnection mechanism, which is typically one or more buses. Input devices which may include, for example, a keyboard, keypad, trackball, mouse, pen and tablet, video input, digital camera, or image scanner are also included. Output devices which may include graphics console, which may be cathode ray tube (CRT) display, liquid crystal display (LCD) or other type of display system are also included. The input and output devices may be included within or external to a main unit which typically houses the processor, memory system and interconnection mechanism.

Communication devices may be connected to the interconnection mechanism and may include network interfaces such as a modem, ATM or Ethernet interface card. The computer system 102 may be a general purpose computer system, which is programmable using a high level computer programming language. The computer system may also be implemented using specially programmed, special purpose hardware. In the general purpose computer system embodiment, the processor is typically a commercially available processor, such as the Pentium microprocessor from Intel Corporation, PowerPC microprocessor, SPARC processor, PA-RISC processor or 68000 series microprocessor. Many other processors are also available. Such a processor usually executes a program called an operating system, such as the various versions of the Windows and DOS operating systems from Microsoft Corporation, or the Unix operating system available from many vendors such as Sun Microsystems, Inc., Hewlett-Packard and AT&T, which controls the execution of other computer programs and provides scheduling, debugging, input-output control, accounting compilation, storage assignment, data management, memory management, and communication control and related services. The processor and operating system define a computer platform 102 for which application programs such as graphics application 106 in high level programming languages are written.

The illustrative embodiment of the present invention includes implementing code written in the C programming language. It should be understood that the invention is not limited to a particular computer platform, particular operating system, particular processor, or particular high level programming language. Those skilled in the art will appreciate that different implementations, including different function names, programming languages (such as C or C++), data structures, and/or algorithms may also be used in other embodiments of the present invention.

The software routines for performing software application integration in accordance with the invention typically reside in memory and/or disk storage unit, and may be stored on a computer-readable medium such as, for example, magnetic disk, compact disk or magnetic tape and may be loaded into the computer system using an appropriate peripheral device, as known in the art. It will be understood that the hardware components identified above are given by way of example only and that the invention may be implemented in a variety of different computer systems.

To better envision how a graphics tool 218 and the hooks module 118 interact, an exemplary process illustrating how the hooks module 118 responds to requests from a graphics debug tool is illustrated in FIG. 7. In FIG. 7, the left-hand column refers to the steps performed by the debug graphics tool while the right-hand column illustrates the steps which are performed by the computer graphics system 102 with the hooks module 118 incorporated therein. The steps performed by the debug graphics tool are referred to herein as tool step # while the steps performed by the hooks module 118 and referred to as app step # to reflect the preferred software embodiment illustrated in FIG. 6 wherein a graphics tool process 602 and graphics application process 604 are executed on a computer graphics system 102.

During a typical operation, the graphics application 106 is started (app step 1) and runs for some time (app step 2). Some time later, the operator decides to start the debug graphics tool (tool step 1) and attach the tool to the currently executing application process 602.

Once the debug tool has requested to attach to the graphics application 106, the application 106 detects this request at the next screen refresh and the hooks module 118 is enabled by installing the hooks API event generators 226 into the active dispatch table 226 (app step 3). The graphics application process 260 then runs for some time and per-frame operations and events are handled (app step 4). This process is continued indefinitely and as the application process 602 continues to handle per-frame operations since no API events or internal events have yet to be enabled.

At some time later, the operator decides to perform some type of evaluation and control operations, such as setting a breakpoint on a graphics API fimction, such as glBegin function call (tool step 3).

In the graphics application 602, many glBegin function calls occur (app step 5), yet no breakpoint happens until the next screen clear occurs at which time the hooks module 118 receives the next hooks event. At the next screen clear, the set breakpoint on glBegin event is received by the hooks module 118 and set in the API event generator (app step 6). Now that the breakpoint has been set, at the next glBegin function call, the graphics application process 602 will generate a hooks event from the glBegin API event generator (app step 7).

When this occurs, the debug tool receives the API hooks event and notifies the operator that the break has occurred (tool step 4). While the tool is reporting this information to the operator, the graphics application process 602 continues to loop while it waits for a break-continue event (app step 8). When the operator directs the debug tool to continue from the breakpoint, the debug tool generates another hooks event to the application process 602 indicating such an occurrence (tool step 5). The graphics application 602 continues until the next glBegin function call occurs and another API hooks event is generated from the API event generator 226 (app step 9).

Meanwhile, the debug tool receives the API hooks event and notifies the operator that the break has happened (tool step 6). During this time, the graphics application process continues to loop in looking for a break-continue hooks event from the debug tool (app step 10). Then the operator directs the debug tool to delete the break-point which sends another hooks event to the application only here it is a break-clear event (tool step 7), causing the graphics application process 602 to then continue the test and evaluation mode of operation with the hooks module enabled.

While various embodiments of the present invention have been described above, it should be understood that they have been presented by way of example only, and not limitation. For example, in an alternative embodiment, when the hooks module 118 is enabled, the graphics tools 218 specify the specific type of access desired. For example, a performance monitor tool may have different requirements than a debugger, or, the same tool 218 may be implemented to perform different types of operations. In such circumstances, the hooks module 118 may install different API and internal event generators 226–230. This may be accomplished, for example, through the creation of many hooks dispatch tables 214, each installing a different group of API event generators 226. The hooks event manager 204 may likewise utilize different arrays of internal event enable/disable boolean, or may mask the array in accordance with the type of tool 218 that is being implemented. It should be also understood that the hooks module of the present invention may be installed within any graphics library now or later developed, regardless of the application program interface provided by such a library. Furthermore, in the illustrative embodiment discussed above, the API event generators and the internal event generators are enabled or disabled individually. However, as one skilled in the relevant art would find apparent, the event generators may be enabled or disabled on a group or class basis. This may be more efficient as well as support the partial attachment embodiment discussed immediately above. Thus, the breadth and scope of the present invention are not limited by any of the above-described exemplary embodiments, but are defined only in accordance with the following claims and their equivalents.

What is claimed is:

1. A computer graphics system comprising:
    graphics hardware;
    a graphics library for controlling said raphics hardware, said graphics library including gaphics library functions responsive to function calls generated by graphics applications;
    a graphics diagnostic tool for evaluating and controlling said computer graphics system; and
    a hooks module integrated within said computer graphics system for dynamically attaching said graphics diagnostic tool to predetermined portions of said computer graphics system during normal operations of said graphics application executing on the computer gaphics system, wherein said hooks module includes one or more event generators, operatively located in said graphics library, configured to perform a diagnostic operation during normal operations of said graphics application.

2. The system of claim 1, wherein said graphics library further includes an applications program interface (API) for invoking said graphics library functions in response to commands generated by said graphics application, and wherein said one or more event generators comprises:
    at least one API event generator operatively located in said graphics library, wherein said at least one API event generator performs selected diagnostic operations related to an associated one or more graphics library functions,
    wherein said at least one API event generator is configured to be dynamically enabled and disabled to perform said selected diagnostic operations.

3. The system of claim 2, wherein said one or more event generators comprises:
    one or more internal event generators embedded in said graphics library to perform continuously selected diagnostic operations.

4. The system of claim 3, wherein said graphics library further includes graphics hardware control modules for controlling said graphics hardware, and wherein said one or more internal event generators are embedded in said control modules to provide said attached graphics diagnostic tool access to an associated operation in said graphics hardware control modules.

5. The system of claim 4, wherein said hooks module further comprises:

means for dynamically redirecting one or more of said function calls generated by said graphics application to one of said API event generators, wherein said API event generators include means for calling said graphics library function identified in said redirected function call.

6. The system of claim 5, wherein said redirecting means comprises:

a normal operations dispatch table including function pointers to said graphics library functions;

a hooks dispatch table including function pointers to said at least one API event generator; and a dispatch table manager constructed and arranged to copy selected portions of said normal operations dispatch table and said hooks dispatch table to said graphics library to form an active dispatch table in said graphics library.

7. The system of claim 3, wherein said graphics library includes pipeline control modules for managing a graphics pipeline in said graphics system, wherein said internal event generators comprise:

pipeline control module event generators embedded in said pipeline control modules for providing said attached graphics diagnostic tool access to said pipeline control modules.

8. The system of claim 4, wherein said hooks module further comprises:

means for enabling said internal event generators in said graphics library.

9. The system of claim 3, wherein said graphics library includes device-specific control modules for managing a specific portions of said graphics hardware, wherein said internal event generators comprise:

device-specific event generators for providing said attached graphics tool access to said device-specific control modules.

10. The system of claim 2, wherein said hooks module further comprises:

a normal operations dispatch table including function pointers to said graphics library functions;

a hooks dispatch table including function pointers to said API event generators; and a dispatch table manager constructed and arranged to copy selected portions of said normal operations dispatch table and said hooks dispatch table to said graphics library to form an active dispatch table in said graphics library, wherein, in response to graphics application function calls, said API calls one of either said at least one API event generator or said graphics library functions in accordance with a function pointer located in said active dispatch table.

11. The system of claim 1, wherein said one or more event generators comprises:

at least one internal event generator embedded permanently in said graphics library to perform continuously selected diagnostic operations to provide said graphics diagnostic tool with information pertaining to internal state and control flow of the graphics system.

12. The system of claim 1, wherein said graphics diagnostic tool and said hooks module communicate with each other through a graphics tool interface.

13. The system of claim 12, wherein said graphics tool interface is an interprocess communications (IPC) mechanism providing socket communications between said graphics diagnostic tool and said hooks module.

14. The system of claim 2, wherein said API is a an OpenGL API.

15. The system of claim 1, wherein said graphics hardware is the Visualize FX graphics system.

16. The system of claim 1, wherein said one or more event generators include at least one first event generator that causes the graphics system to incur significant performance penalties while performing said diagnostic operations, and at least one second event generator that does not cause the graphics system to incur significant performance penalties while performing said diagnostic operations, wherein said hooks module dynamically enables said at least one first event generator to temporarily perform said diagnostic operations only when required, and to permanently enable said at least one second event generator to perform said diagnostic operations continually.

17. The system of claim 1, wherein said one or more internal event generators provide the graphics diagnostic tool with access to internal state and control flow of the graphics system, and wherein said hooks module sends said graphics diagnostic tool a stream of state information sufficient to recreate a current state of the graphics system.

18. The system of claim 17, wherein said hooks module enables the graphics tools to control storage and replay of the state and operations of the graphics application.

19. A hooks system for providing a graphics diagnostic tool access to a computer graphics system having graphics hardware and a graphics library for controlling the graphics hardware in response to function calls received from a graphics application executing on the graphics system to evaluate and control a graphics application executing on the computer graphics system, the hooks system comprising:

a plurality of application program interface (API) event generators located in the graphics library of the graphics system, each event generator performing predetermined diagnostic operations relating to an associated one or more graphics library functions and for generating results of said diagnostic operations; and a dispatch table manager for dynamically selecting an active dispatch table from a normal operations dispatch table having function pointers to said graphics library functions and from a hooks dispatch table having function pointers to said API event generators, in response to a request from the graphics diagnostic tool.

20. The system of claim 19, further comprising:

internal event generators, integrated along various locations of said graphics library, for performing predetermined diagnostic operations in said graphics system; and a hook event manager constructed and arranged to enable selected ones of said internal event generators in response to requests from the graphics diagnostic tool.

21. The system of claim 20, wherein said plurality of API event generators provide said attached graphics diagnostic tool with results of said selected diagnostic operations.

22. The system of claim 20, wherein said plurality of API event generators comprises:

means for enabling said attached graphics diagnostic tool to control said selected operations related to said associated graphics library function.

23. The system of claim 20, wherein said graphics diagnostic tool and said hooks module communicate with each other through a graphics tool interface including an interprocess communications (IPC) mechanism providing socket communications between said graphics diagnostic tool and said hooks module.

24. The system of claim 20, wherein said internal event generators provide the graphics diagnostic tool with access to internal state and control flow of the graphics system, and wherein said hooks module sends the graphics diagnostic tools a stream of state information sufficient to recreate a current state of the graphics system.

25. The system of claim 20, wherein said hooks module enables the graphics diagnostic tools to control storage and replay of the state and operations of the graphics application.

26. The system of claim 19, wherein said dispatch table manager comprises:
    means for dynamically redirecting one or more of said function calls generated by said graphics application to said API event generators, wherein said API event generators include means for calling said graphics library functions identified in said redirected function call.

27. The system of claim 26, wherein said graphics library includes pipeline control modules for managing a graphics pipeline in said graphics system, wherein said internal event generators comprise:
    pipeline control module event generators for providing said attached graphics tool access to said pipeline control modules.

28. The system of claim 27, wherein said graphics library further includes device-specific modules for controlling components of said graphics hardware, wherein said internal event generators further comprises:
    device-specific module event generators for providing said attached graphics tool access to said device-specific control modules.

29. The system of claim 28, wherein said device-specific module event generators further provide said attached graphics diagnostic tool access to components of said graphics hardware.

30. The system of claim 19, wherein said graphics diagnostic tool and said hooks system communicate with each other through a graphics tool interface.

31. The system of claim 30, wherein said graphics tool interface is an interprocess communications (IPC) mechanism providing socket communications between said graphics diagnostic tools and said hooks module.

32. The system of claim 19, wherein said graphics library includes an OpenGL API.

33. The system of claim 11, wherein said graphics hardware is a Visualize FX graphics system.

34. A computer program product for use with a computer graphics system having graphics hardware, at least one central processing unit (CPU), an operating system, a graphics application and a graphics library including a plurality of graphics library functions to be executed thereon, the graphics library controlling the graphics hardware in response to commands received from a graphics application executing on the graphics system, the computer program product comprising a computer usable medium having embodied therein computer readable program code constructed and arranged to provide a graphics tool access to the computer graphics system, the computer program product comprising:
    a plurality of application program interface (API) event generators located in the graphics library, the event generators performing predetermined diagnostic operations relating to an associated one or more graphics library functions and for generating results of said diagnostic operations, wherein said event generators each include a function pointer to said associated graphics library function;
    a hooks dispatch table comprising function pointers to said event generators; and
    a dispatch table manger for dynamically replacing a normal operations dispatch table comprising function pointers to the graphics library functions with said hooks dispatch table, wherein said replacement of said normal operations dispatch table and subsequent execution of said hooks dispatch table occur while graphics aplication is executing and without causing interruption of said execution of said gaphics application.

35. The computer program product of claim 34, further comprising:
    internal event generators, integrated along various locations of said graphics library, for performing predetermined diagnostic operations in said graphics system; and
    a hook event manager constructed and arranged to enable selected ones of said internal event generators in response to requests from the graphics tool.

36. The computer program product of claim 35, wherein said one or more API event generators comprises:
    an event request receiver for enabling said attached graphics tool to monitor said selected diagnostic operations related to said associated graphics library function.

37. The computer program product of claim 35, wherein said one or more API event generators comprises:
    means for enabling said attached graphics tool to control said selected operations related to said associated graphics library function.

38. The computer program product of claim 35, wherein said graphics library includes pipeline control modules for managing a graphics pipeline in said graphics system, wherein said internal event generators comprise:
    pipeline control module event generators for providing said attached graphics tool access to said pipeline control modules.

39. The computer program product of claim 38, wherein said graphics library further includes device-specific modules for controlling components of said graphics hardware, wherein said internal event generators further comprises:
    device-specific module event generators for providing said attached graphics tool access to said device-specific control modules.

40. A computer graphics evaluation and control system for providing a graphics diagnostic tool access to a computer graphics system that includes graphics hardware and a graphics library for controlling said graphics hardware, said graphics library including graphics library functions responsive to function calls generated by said graphics application, said system comprising:
    a plurality of internal event generators embedded permanently in the graphics library to perform continuously diagnostic operations during normal operations of said graphics application.

41. The system of claim 40, wherein said plurality of internal event generators perform continuously said diagnostic operations to provide said graphics tool with information pertaining to internal state and control flow of the graphics system.

42. The system of claim 40, wherein said graphics library further includes graphics hardware control modules for controlling said graphics hardware, and wherein said one or more internal event generators are embedded in said control modules to provide said attached graphics tool access to an associated operation in said graphics hardware control modules.

43. The system of claim 42, wherein said internal event generators provide the graphics tool with access to internal state and control flow of the graphics system, and wherein said system sends the graphics tool a stream of state information sufficient to recreate a current state of the graphics system.

44. The system of claim 43, wherein said system enables the graphics tool to control storage and replay of the state and operations of the graphics application.

45. The system of claim 40, wherein said system further comprises:

means for enabling said internal event generators in said graphics library.

46. The system of claim 40, wherein said graphics library includes pipeline control modules for managing a graphics pipeline in said graphics system, wherein said internal event generators comprise:

pipeline control module event generators embedded in said pipeline control modules for providing said attached graphics tool access to said pipeline control modules.

47. The system of claim 40, wherein said graphics library includes device-specific control modules for managing a specific portions of said graphics hardware, wherein said internal event generators comprise:

device-specific event generators for providing said attached graphics tool access to said device-specific control modules.

48. The system of claim 40, wherein said graphics library includes an OpenGL application program interface (API).

* * * * *

UNITED STATES PATENT AND TRADEMARK OFFICE
CERTIFICATE OF CORRECTION

PATENT NO.   : 6,314,470 B1
DATED        : November 6, 2001
INVENTOR(S)  : Ward et al.

It is certified that error appears in the above-identified patent and that said Letters Patent is hereby corrected as shown below:

Column 18,
Line 27, delete "raphics" and insert therefor -- graphics --
Line 37, delete "gaphics" and insert therefor -- graphics --

Column 19,
Lines 34-35, delete "for managing a specific portions" and insert therefor -- each configured to manage a specific portion --
Line 38, after "graphics" insert -- diagnostic --

Column 20,
Line 2, delete "tool" and insert therefor -- tools --
Line 3, after "API is" delete "a"

Column 21,
Line 48, delete "claim 11" and insert therefor -- claim 19 --

Column 22,
Line 5, delete "manger" and insert therefor -- manager --

Signed and Sealed this

Fourteenth Day of October, 2003

JAMES E. ROGAN
*Director of the United States Patent and Trademark Office*